(12) United States Patent
Shver

(10) Patent No.: US 6,342,086 B1
(45) Date of Patent: Jan. 29, 2002

(54) METHOD AND APPARATUS FOR IMPROVED EAF STEELMAKING

(75) Inventor: Valery G. Shver, Alpharetta, GA (US)

(73) Assignee: Process Technology International, Inc., Tucker, GA (US)

( * ) Notice: Subject to any disclaimer, the term of this patent is extended or adjusted under 35 U.S.C. 154(b) by 0 days.

(21) Appl. No.: 09/251,193

(22) Filed: Feb. 16, 1999

(51) Int. Cl.⁷ ............................................. C21B 11/12
(52) U.S. Cl. ...................................... 75/10.4; 75/10.46
(58) Field of Search ............................. 75/10.4, 10.46, 75/530, 708; 266/48, 222

(56) References Cited

U.S. PATENT DOCUMENTS

| | | | |
|---|---|---|---|
| 4,455,176 A | * | 6/1984 | Fuhrhop ..................... 148/194 |
| 5,042,964 A | * | 8/1991 | Gitman ......................... 432/13 |
| 5,814,125 A | * | 9/1998 | Anderson et al. ............. 75/414 |
| 5,954,855 A | * | 9/1999 | Gitman et al. ............. 75/10.42 |
| 6,096,261 A | * | 8/2000 | Anderson et al. ........... 266/265 |

* cited by examiner

Primary Examiner—Roy King
Assistant Examiner—Tima McGuthry-Banks
(74) Attorney, Agent, or Firm—William A. Marvin

(57) ABSTRACT

An improved method and apparatus for EAF steelmaking wherein the method provides additional thermal energy to the steel making process, carbon injection for the formation of foamy slag, and oxygen injection for the decarburization of the melt, the formation of foamy slag and post combustion burning of carbon monoxide. The apparatus comprises a unique burner configuration which has a central conduit for alternatively supplying fluid hydrocarbon fuel or particulate carbon with a carrier gas which are discharged through a exit opening. The fuel or carbon is mixed with a high speed, preferably supersonic, stream of oxidizing gas. The high speed stream of oxidizing gas is provided by an annular supersonic nozzle which causes the oxidizing gas to surround the fuel or the particulates with an annular flow. The annular nozzle design can be adjusted to direct the flows of particulates and oxidizing gases in the areas and shapes desired for efficient management of the steelmaking process. Optionally, the burner can have another conduit for the secondary supply of a pressurized flow of hydrocarbon fluid fuel to a series of apertures which surround the annular flow. Further, optionally, the burner can have another conduit for the supply of a pressurized flow of a secondary oxidizing gas to a series of apertures which surround the annular flow.

9 Claims, 7 Drawing Sheets

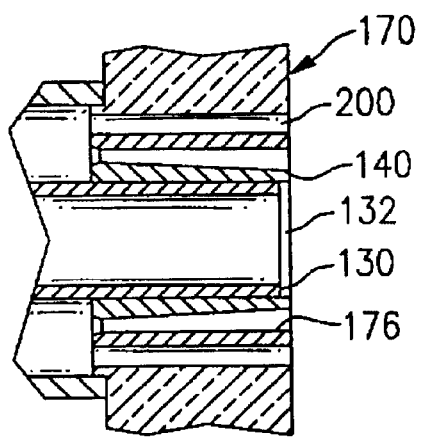
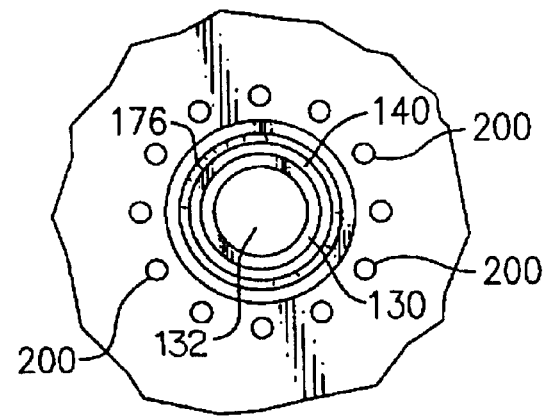
FIG.8     FIG.9
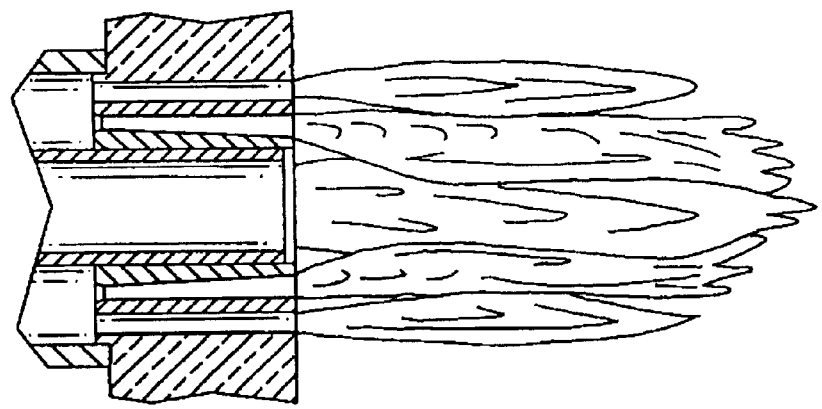
FIG.13

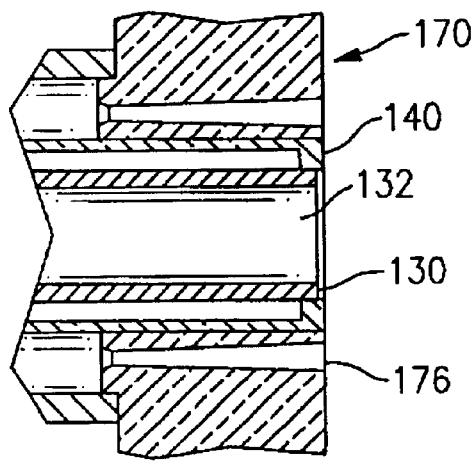 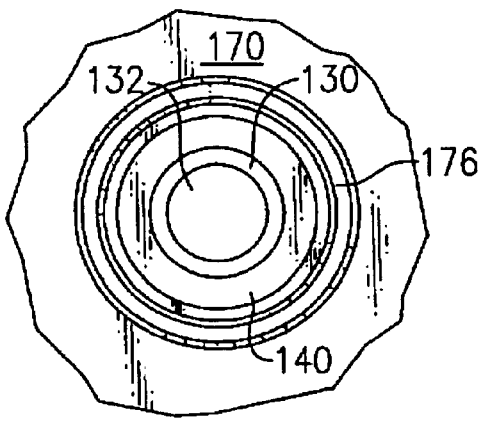
FIG.10           FIG.11
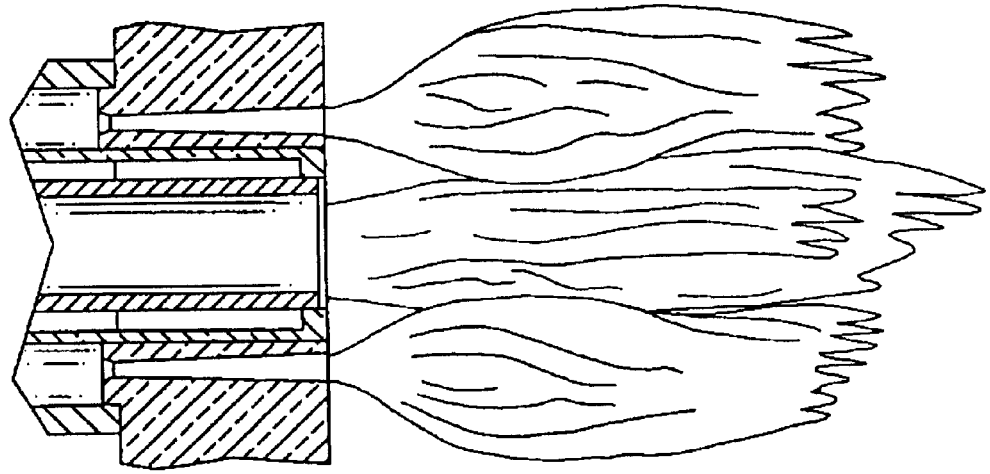
FIG.15

METHOD AND APPARATUS FOR IMPROVED EAF STEELMAKING

BACKGROUND OF THE INVENTION

1. Field of the Invention

The present invention generally relates to a method and apparatus for metal melting, refining and processing, for example steelmaking in an electric arc furnace (EAF), and more particularly, to an auxiliary burner or lance for the injection of either additional thermal energy, oxidizing gas for oxidizing liquid metal, post combustion of carbon monoxide or the like, and particulates for slag and foamy slag production, or the like.

2. Description of Background Art

Oxygen and carbon injection lances are known in the art of steelmaking to be useful for the injection of these materials or others to enhance many steps in the process. In addition, oxy-fuel burners have been used to provide auxiliary thermal energy and supersonic oxygen to these processes. Additionally, there have been some attempts to combine oxygen and carbon injection lances with the oxy-fuel burner function. An important question for the integration of these functions into one apparatus has been whether to retain particulate injection capability or supersonic oxygen capability because both functions are the most advantageous if located along the central axis of the lance or burner.

Particulate injection is best done through a straight conduit which is located along the central axis of the apparatus used. A straight conduit is conventional because the particulates injected into a steel making furnace are highly abrasive and will wear out bends or other restrictions to their flow quickly. This is one of the reasons why particulates have not be injected through the same conduit as the one used for supersonic oxygen of a burner, the particulates would quickly wear out the converging restriction of the nozzle. A central conduit is preferred because it is highly disadvantageous to break the stream into more than one flow because one would like to concentrate particulates in a specific area. Also, the size of the particles and amount of particulates used for an injection is large in mass compared to other injected materials, such as gases, and a relatively large conduit is needed for reasonable flow rates.

Laval or supersonic nozzles are usually used in the production of high speed streams of oxidizing gas for injection into a steel making furnace. These supersonic gas flows are produced by the converging/diverging shape of the nozzle which at above a critical pressure causes the gas flow though the nozzle to become supersonic. Usually, an conduit is machined centrally in a lance or burner and then the passage is fitted with a converging/diverging section or nozzle. A large centrally located nozzle is desired because of the flow rates of supersonic oxygen desired.

It is also highly desirable to provide a subsonic flow of oxidizing gas for the burning of fuel for the addition of auxiliary thermal energy, and the supersonic oxygen flow for providing oxygen in iron melt decarburization, assisting in foamy slag production or post combustion of carbon monoxide. A burner which provides subsonic and supersonic flows of oxygen through the same centrally located conduit is manufactured and commercially sold by Process Technology International, Inc. of Tucker, Georgia. The subsonic flow is produced by providing a pressure in the supply conduit lower than the critical pressure of the Laval nozzle being used in the conduit. When supersonic oxygen is needed the pressure in the supply conduit is increased to above the critical pressure.

One attempt to combine the functions of carbon injection and supersonic oxygen in one apparatus is shown in U.S. Pat. No. 5,599,375. In FIGS. 3 and 5, a burner is described having carbon injection and supersonic oxygen. However, the carbon injection is not coaxial to the stream of oxidizing gas introduced through the burner and cannot be directed in sufficient quantities to be advantageous. Another attempt is shown in the same reference in FIG. 6 where a central carbon injection pipe is surrounded by a plurality of oxygen generating apertures which are described as Laval nozzles. This configuration is highly disadvantageous due to the small supersonic openings and dispersion of the supersonic oxygen due to flow turbulence of each small aperture interacting with that of the other apertures.

SUMMARY OF THE INVENTION

The invention provides an improved method and apparatus for steelmaking. The method includes the steps of providing additional thermal energy to the steel making process, providing particulate injection for the formation of foamy slag, and providing oxidizing gas injection for the decarburization of the melt, formation of foamy slag and post combustion of CO. These steps may be accomplished in any order, and may be accomplished either alone or in combination with one or more of the other steps. In addition, the step of providing oxidizing gas may provide it at high velocity which preferably is supersonic or at a lower velocity such as subsonic.

The apparatus provides a unique burner configuration that in a single integrated apparatus can efficiently perform the multiple functions of the method. The burner accomplishes this by operating in multiple modes including at least a burner mode, an oxygen lancing mode and particulate injection mode.

The invention in the apparatus implementation includes a unique burner configuration which has a central conduit for selectively supplying either fluid hydrocarbon fuel or particulate matter, preferably carbon particles, which is entrained in a carrier or transport gas through its exit opening. The fuel or carbon particles are mixed with a high speed annular stream of gas, preferably an oxidizing gas such as commercially pure oxygen. In the preferred embodiment, the high speed flow of oxidizing gas is provided by an annular supersonic nozzle which causes an annular flow of oxidizing gas to selectively surround the fuel or the carbon particles. The annular nozzle allows a coaxial annular flow of oxidizing gas to be mixed with the fuel or particulates at subsonic or supersonic rates, while still being able to supply independent supersonic oxidizing gas with a desirable lancing capability at other times.

Several implementations of the annular nozzle are shown which are used to direct the flow of the oxidizing gas, and as a consequence the fuel or the particulates, in a desired pattern for performing a specialized function. The annular flow from the nozzle can be tailored from a substantially inwardly directed flow where the annular flow tends to concentrate toward the center axis of the nozzle to a substantially outwardly directed flow where the annular flow tends to disperse from the center axis of the nozzle, to anywhere in between, such as a partially inwardly directed flow and partially outwardly directed flow. The shaping of the annular flow is accomplished by varying the contour that the inner and outer surfaces which form the annular diverging section of the nozzle make with the centerline of the annular restriction. This variation in the shaping of the diverging section essentially redirects the annular flow vector from parallel to the central axis of the nozzle to either inwardly toward the central axis or outwardly from the central axis, or any combination therebetween.

In one advantageous implementation, the diverging section of the annular nozzle has an asymmetric cross-section where the outer surface contour diverges away from the nozzle center axis more quickly than the inner surface contour. This embodiment tends to cause the annular flow vector to be outwardly directed from the center axis of the nozzle. Another advantageous implementation has an asymmetric cross-section with the inner surface contour of the diverging section of the annular nozzle diverging from the center axis of the nozzle more quickly than the outer surface contour. This embodiment tends to cause the annular flow vector to be inwardly directed toward the center axis of the nozzle. Still another advantageous implementation has an symmetric cross-section with the inner surface contour of the diverging section of the annular nozzle diverging from the center axis of the nozzle at substantially the same rate as the outer surface contour. This embodiment tends to cause the annular flow to be equally inwardly directed toward the center axis of the nozzle and outwardly directed from the center axis of the nozzle.

In an optional embodiment, the annular supersonic nozzle in any of its various embodiments is surrounded by a plurality of shrouding apertures which are supplied with a pressurized gas to produce a subsonic but high velocity shroud of gas surrounding the annular supersonic flow. Preferably, but not necessarily, the shrouding gas is an oxidizing gas. If the shrouding gas is an oxidizing gas, preferably it supplied from the same source as supplies the annular nozzle.

Optionally, in another embodiment the burner has another conduit for the supply of a pressurized flow of a second fuel flow surrounding the annular flow of oxidizing gas from a series of first apertures.

Optionally, in yet another embodiment the burner has another conduit for the supply of a pressurized flow of a second oxidizing gas surrounding either the annular flow or secondary fuel flow from a series of second apertures.

These and other objects, aspects and features of the invention will be more clearly understood and better described when the following detailed description is read in conjunction with the attached drawings, wherein:

BRIEF DESCRIPTION OF THE DRAWINGS

FIG. 8 is a cross-sectional side view of the nozzle assembly of a fourth embodiment of the burner illustrated in FIG. 1A;

FIG. 9 in an end view of the burner illustrated in FIG. 8;

FIG. 10 is a cross-sectional side view of the nozzle assembly of a fifth embodiment of the burner illustrated in FIG. 1A;

FIG. 11 in an end view of the burner illustrated in FIG. 10;

FIG. 13 is a pictorial representation of a nozzle having a converging annular flow;

FIG. 15 is a pictorial representation of a nozzle having a partially converging and partially diverging annular flow.

DETAILED DESCRIPTION OF A PREFERRED EMBODIMENT

Figure 1A:
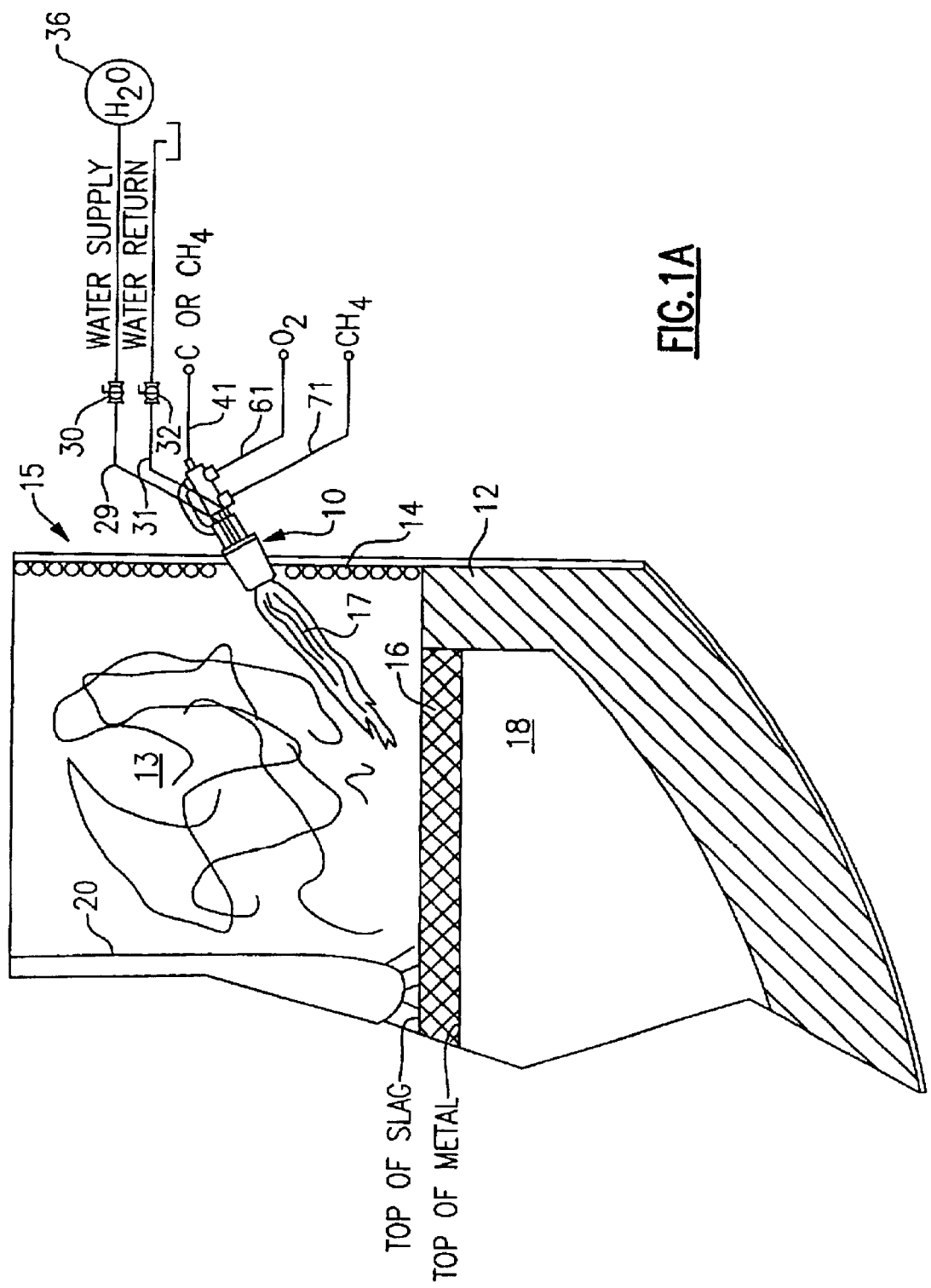
FIG. 1A is schematic system drawing of the mounting of the improved burner in an electric arc furnace shown partially in cross-section.
Figure 1B:
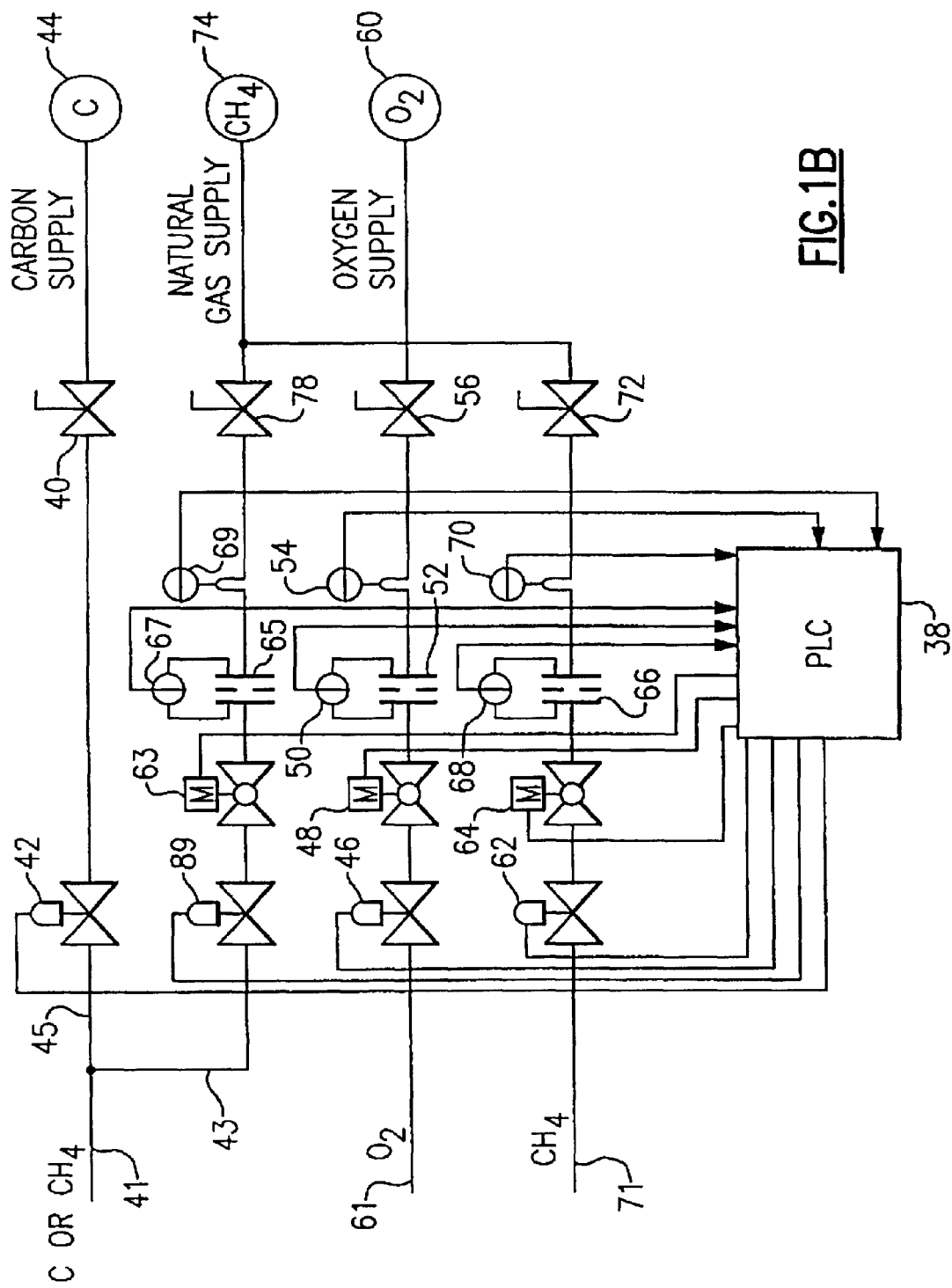
FIG. 1B is schematic system diagram of the control system and utility provision for the burner illustrated in FIG. 1A.
Figure 3:
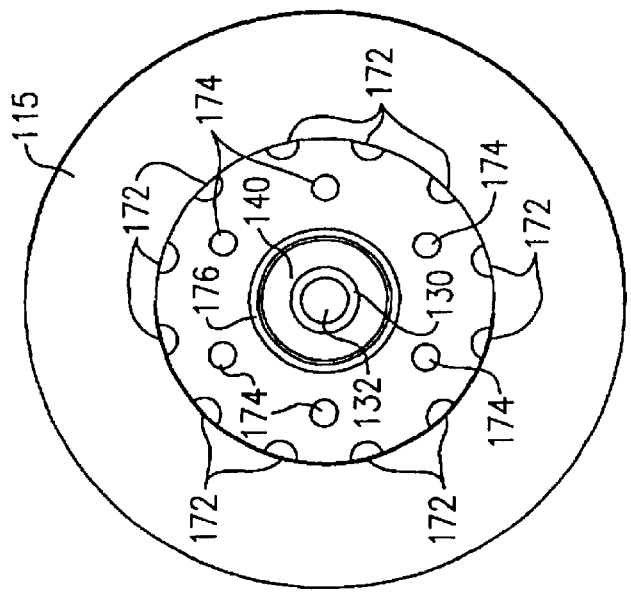
FIG. 3 is an end view of the burner illustrated in FIG. 2.

A burner 10 which is capable of operating in several different modes to provide either additional thermal energy, metal refining and/or other metallurgical processing capabilities in an electric arc furnace (EAF) 15, or other process furnace, is shown to advantage in FIGS. 1A and B. The EAF 15 conventionally melts ferrous scrap 13, or other ferrous materials, by means of an electric arc produced from one or more electrodes 20 to produce a molten metal melt 18 at its bottom. One or more of the burners 10 may assist in the process by providing additional thermal energy to melt the scrap faster. The iron melt 18 is generally covered with various amounts of slag 16 which is produced during the process of melting the metal from additives to the process.

The burner 10 is preferably mounted in the side wall 12 of the shell of the EAF 15 through an aperture in the fluid cooling elements 14 of the wall of the furnace and inclined downward at an angle to direct a flame 17, or other injected materials and gases, from the burner toward the metal melt 18 in the bottom of the furnace. The burner 10 may be water cooled to withstand the high temperatures inside the furnace 15.

The burner 10 is supplied with three main utilities from an oxidizing gas (preferably oxygen) supply 60, a gaseous or liquid fuel (preferably natural gas) supply 74 and a particulates (preferably carbon) supply 44. Each of the utility supplies 44, 60 and 74 is coupled to the burner 10 through a separate utility supply line 41, 61 and 71 which includes a number of controlled valves and sensing devices to control the flow of the respective utility. For example, the oxygen supply line 61 from oxygen supply 60 includes an electrical shut off valve 46, a motorized control valve 48, an orifice 52 and a manual shut off valve 56. A differential pressure transmitter 50 is coupled across the orifice 52 to measure the pressure drop produced by the restriction and a pressure transmitter 54 coupled to the supply line 61 measures the supply line pressure. Similarly, the natural gas supply line 71 includes an electrical shut off valve 62, a motorized control valve 64, an orifice 66 and a manual shut off valve 72. A differential pressure transmitter 68 is coupled across the orifice plate 66 to measures the pressure drop produced by the restriction and a pressure transmitter 70 is coupled to the supply line 71 to measure the supply line pressure.

Additionally, the particulates or fuel supply line 41 includes in a particulates supply branch 45 an electrical shut off valve 42 and a manual shut off valve 40 and includes in a fuel supply branch 43 an electrical shut off valve 89, a motorized control valve 63, an orifice 65 and a manual shut off valve 73. A differential pressure transmitter 67 is coupled across the orifice plate 65 to measures the pressure drop produced by the restriction and a pressure transmitter 69 is coupled to the supply line 43 to measure the supply line pressure. The supply line 41 preferably provides for the selective alternative supply of either particulates or fuel but could in certain instances supply both together.

The modes and sequencing of operation of the burner 10 are controlled by a programmable logic controller (PLC) 38. The PLC 38 receives electrical inputs from the pressure transmitters 50, 54, 67, 68, 69, 70 corresponding to the measured pressures and differential pressures and determines the actual flow of the gases in the supply lines 43, 61 and 71 from those parameters. The PLC 38 then provides electrical signals to the motorized control valves 48, 63 and 64 to regulate the gas flow to a desired rate which has been programmed in the PLC for the different modes and sequences of operation. The PLC 38 also provides electrical signals to each of the electrical shut off valves 42, 46, 62, and 89 so that the control may selectively turn on the supplies or shut them off under programmed control. A flow of cooling fluid to the burner 10 is provided by a cooling fluid supply 36 which provides a flow of water through a water supply line 29. The water circulates through the burner 10 to cool it and then is discarded via a water return line 31. Valves 30, 32, 40, 56, 72 and 73 are provided to shut off the flow of utilities manually, if required, such as when the burner 10 is being removed for maintenance.

There are at least three modes of operation for the burner 10 illustrated in FIG. 1A. The first is a burner mode in which oxidizing gas and fuel are supplied to the burner in a specified ratio. Either one or both fuel supply lines 71 and 41 can be used depending upon the needs of the specific furnace. If supply line 41 is used, either one or both of its fuel sources can be accessed to support the combustion. This mode generally is used to provide additional thermal energy to the furnace in a rapid manner to help melt the scrap. The second mode is an oxygen lancing mode where supersonic oxygen is supplied to the furnace for liquid metal refining, to build a foamy slag, or to post combust carbon monoxide. The third mode is a particulate injection mode where the burner is used to supply particulate matter suspended in a carrier gas to the furnace for metallurgical purposes. In this mode particulate carbon can be injected to assist in the formation of foamy slag or to recarburize the molten metal. These modes can be used alone or in combination with one another. In certain instances the combination of particular modes is synergistic in that the advantages of the modes combine as will be more fully discussed herein.

Figure 2:
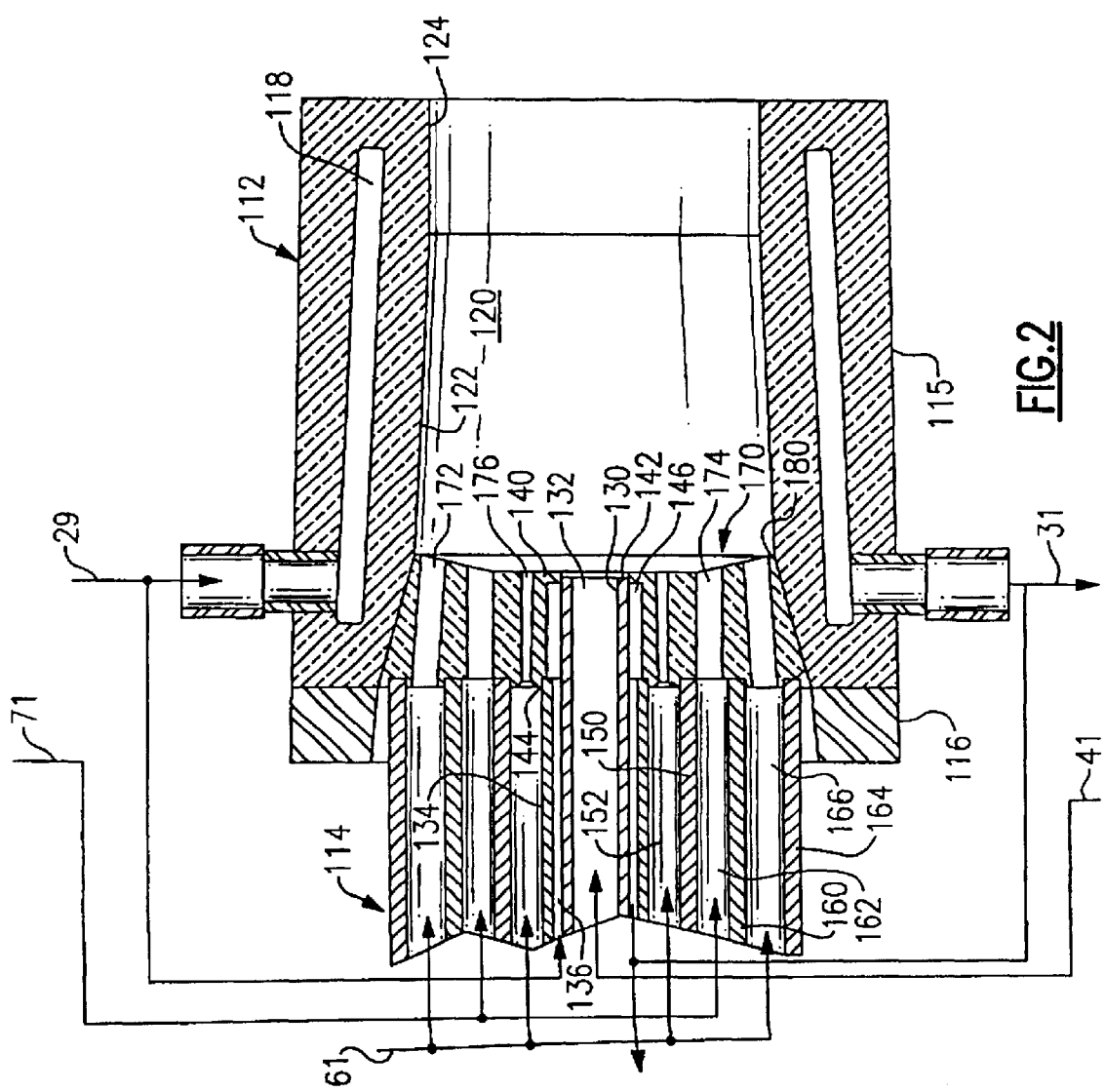
FIG. 2 is a partial cross-sectional side view of the burner illustrated in FIG. 1.

In FIG. 2, a partial cross-section of the burner 10 with the capability of injecting or introducing fuel and an oxidizing gas, supersonic oxidizing gas or particulate material is shown to advantage. The burner 10 comprises a combustion chamber 112 for flame shaping and precombustion mixing of the fuel and oxidizing gas and a multiple conduit burner body 114 including nozzle 170 for bringing the injected and introduced materials from the utility supplies lines 41, 61 and 71 to the combustion chamber. The burner body 114 couples to the combustion chamber 112 by means of the generally disk shaped nozzle 170.

The combustion chamber 112 in the illustrated implementation is generally cylindrically shaped and includes a hollow combustion cone 115 welded to a washer shaped mounting plate 116. The combustion cone 115 is preferably manufactured from a material of high thermal conductivity, such as copper, and is provided with an annular cooling chamber 118 which circulates the cooling fluid, preferably water, to pull heat away from the inner surface of the combustion cone 115. The combustion cone 115 surrounds a conically tapered flame shaping chamber 120 which receives the injected materials from the burner body portion 114 through the nozzle 170 at its input end 122 and discharges them through its discharge end 124 after mixing, igniting and shaping the pressurized flow of fuel, oxidizers particulates or other materials. The flame shaping chamber 120 is wider on its input end 122 than at its discharge end 124 so that a positive pressure is maintained inside.

The burner body portion 114 is implemented by a series of conduits, nozzles and orifices arranged to provide a controlled flow of the utilities to be injected or introduced to the flame shaping chamber 120 so that a shaped flame or discharge exits the discharge end 122 of the combustion cone 115. Preferably, a first tubular means 130, defining a first conduit 132 and provided as a high abrasion resistant pipe, extends from the entrance end 122 of the combustion cone 115 to the particulate and fuel supply line 41. The first tubular means 130 is adapted to selectively carry via the first conduit 132, either the natural gas fuel for the addition of thermal energy to the furnace, or a transport gas with a particulate material entrained therein. Preferably, as is shown in the illustrated embodiment, the particulate material is carbon particles which can be injected by their entrainment in a carrier gas.

The first tubular means 130 is concentrically surrounded by a second tubular means 134 in the form of a pipe, somewhat larger in cross-sectional diameter than the first tubular means, defining a second annular shaped conduit 136 between its inner wall and the outer wall of the first tubular means 130. The second conduit 136 is adapted to carry a pressurized cooling fluid, preferably water. The second conduit 136 extends from its entry at the nozzle 170 to the water supply line 29 and water return line 31.

The first and second tubular means 130 and 134 have a step at their discharge ends due to their unequal lengths which mounts a generally cylindrically shaped nozzle cap 140. The nozzle cap 140 fits over the step and receives the first tubular means 130 in a central aperture 142 by a weld and receives the second tubular means 134 by a weld into a machined groove 144. The outer wall of the first tubular means 130 and the inner wall of the nozzle cap 140 define an annularly shaped cooling chamber 146 which is in fluid communication with the second conduit 136. This structure permits a circulation of cooling fluid through the cooling chamber 146 to cool the discharge end of the first tubular means 130.

The second tubular means 134 is concentrically surrounded by a third tubular means 150 in the form of a pipe, somewhat larger in cross-sectional diameter than the second tubular means, defining a third annular shaped conduit 152 between its inner wall and the outer wall of the second tubular means. The third conduit 152 is adapted to carry a pressurized oxidizing gas, preferably oxygen. The third conduit 152 extends from the entry to the nozzle 170 to the oxidizing gas supply line 61.

The third tubular means 150 is concentrically surrounded by a fourth tubular means 160 in the form of a pipe, somewhat larger in cross-sectional diameter than the third tubular means, defining a fourth annular shaped conduit 162 between its inner wall and the outer wall of the third tubular means. The fourth conduit 162 is adapted to carry a either gaseous or fluid fuel, preferably natural gas. The fourth conduit 162 extends from the entry to the nozzle 170 to the natural gas supply line 71.

The fourth tubular means 160 is concentrically surrounded by a fifth tubular means 164 in the form of a pipe, somewhat larger in cross-sectional diameter than the fourth tubular means, defining a fifth annular shaped conduit 166 between its inner wall and the outer wall of the fourth tubular means. The fifth conduit 166 is adapted to carry a pressurized oxidizing gas, preferably oxygen. The fifth conduit 162 extends from the entry to the nozzle 170 to the oxidizing gas supply line 71.

The nozzle 170, generally a disk shaped truncated conical section, is shown to advantage in FIG. 2 and provides sized openings connecting the third, fourth and fifth conduits to the flame shaping chamber 120. The outside conical surface of nozzle 170 is formed to mate with an oppositely shaped conical surface 180 machined in the entrance end 122 of the combustion cone 115. The nozzle 170 is manufactured of a material of high thermal conductivity, preferably copper or the like. The nozzle 170 is cooled by conducting heat through its outside conical surface to the surface 180 of the water cooled combustion chamber 112. The nozzle 170 has a central bore 176 and is counter sunk from its front face with a slight bevel so that the nozzle is easier to keep from being plugged. Around the periphery of the central bore 176 are a plurality of first orifices 174 which, when the burner is assembled as shown in FIG. 2, are in fluid communication with the fourth conduit 162 to provide a second flow of fuel. Around the periphery of the first orifices 174 are a plurality of second orifices 172 which are in fluid communication with the fifth conduit 166 to provide a second flow of oxidizing gas. The ends of the third and fourth tubular means 150, 160 are welded into a mounting groove machined on the back of the nozzle 170 and the fifth tubular means 164 is welded against the inner shoulder of an annular recess machined on the back of the nozzle. The nozzle 170 further include a chamfer of the central bore 176 to provide a first half of a converging section of an annular nozzle as will be more fully explained hereinafter.

When assembled as shown in FIG. 2, the burner 10 comprises a nozzle means which includes the central discharge orifice of the first tubular means, an annular supersonic nozzle formed between the central bore 176 of the nozzle 170 and the nozzle cap 140, and a plurality of secondary and tertiary orifices to supply oxidizing gas and fuel. The central discharge orifice 200 is in fluid communication with the first conduit 132, the annular nozzle is in fluid communication with the third conduit 152, and the plurality of secondary orifices 158 are in fluid communication with the fourth conduit 162.

The annular nozzle formed by the inside surface of the central bore 176 and the outside surface of the nozzle cap 140 is a converging-diverging type of nozzle, typically termed a Laval nozzle. This annular nozzle is designed to accelerate the oxidizing gas to supersonic velocities by properly sizing the input and output clearance between the inner surface of the central bore 176 and outer surface of the nozzle cap 140. The flow through the annular nozzle will become supersonic above a critical pressure if the area of the input of the annular nozzle is maintained in a certain ratio to the output area.

There are several preferred methods of implementing a burner 10 with an annular supersonic or a Laval type nozzle according to the invention. FIGS. 4–11 illustrate several alternative embodiments of annular Laval or Laval type nozzles which are simple and inexpensive to manufacture.

Figure 4:
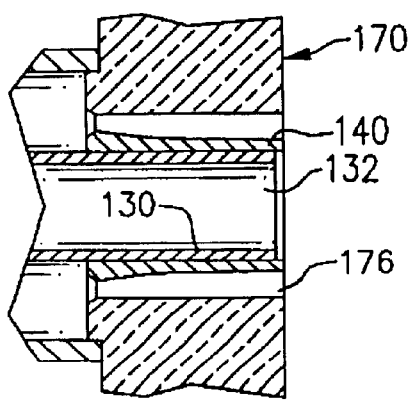
FIG. 4 is a cross-sectional side view of the nozzle assembly of a second embodiment of the burner illustrated in FIG. 1A.
Figure 5:
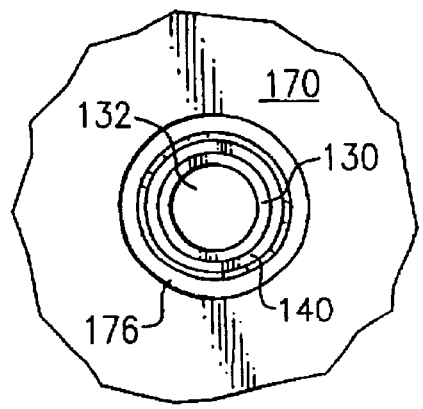
FIG. 5 in an end view of the burner illustrated in FIG. 4.

FIGS. 4 and 5 show an embodiment of the invention where only one contour has been fabricated, preferably that on the outside surface of the nozzle cap. The inside surface of the central bore of the nozzle has been fabricated with a straight bore with only an input chamfer. Alternatively, the only the contour may be applied to the inside surface of the central bore. Still alternatively, as shown in FIG. 2, both surfaces may be contoured.

It is important to make a smooth transition from the smaller (converging) area to the larger area (diverging) in the annular nozzle, but it need not be done symmetrically or exactly according to the equation for a Laval nozzle, although that is one of the preferred techniques of implementing the invention. However, the fabricating of the two opposing contours on the facing surfaces is somewhat more complex than necessary.

Figure 6:
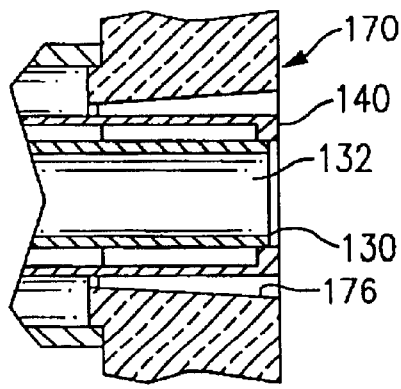
FIG. 6 is a cross-sectional side view of the nozzle assembly of a third embodiment of the burner illustrated in FIG. 1A.
Figure 7:
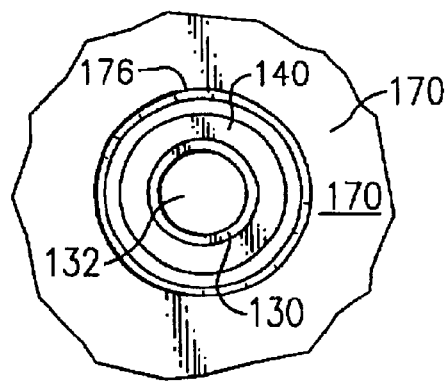
FIG. 7 in an end view of the burner illustrated in FIG. 6.

In additional embodiments of the burner 10 as illustrated in FIGS. 6–11, the invention provides the differences in areas between the intake and discharge portions of the annular nozzle by a less complex surface, such as a conical taper. The conical taper may be applied to the inside surface of the central bore as shown in FIG. 6, or the outside surface of the nozzle cap 140 as shown in FIG. 8. In these embodiments the opposing surface is fabricated as a straight bore. It is also evident that symmetrical conical surfaces can be used as is illustrated in FIG. 10, one for the surface of the nozzle cap 140 and one for the surface of the central bore 176.

Optionally, as more clearly detailed with reference to FIG. 8, the burner 10 in that embodiment has a nozzle 170 which contains a plurality of shrouding outlets 200 circumferentially arranged around the central bore. These outlets, when the burner 10 is assembled, are in fluid communication with the third conduit and provide an increased flow rate of oxidizing gas while maintaining supersonic flow through the annular nozzle. It is evident that the shrouding outlets can be used in combination with any of the other embodiments of the annular nozzle.

Figure 12:
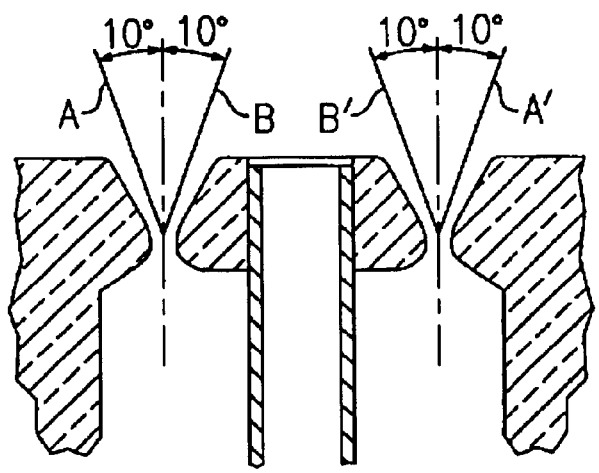
FIG. 12 is a pictorial representation of the annular nozzle illustrating the shaping of the annular flow by varying the angle of the surfaces forming the diverging section of the nozzle.

Another aspect of the invention includes utilizing the configuration of the annular nozzle to direct subsonic and supersonic flows of gases, preferably oxidizing gases and in the preferred embodiment oxygen, into the desired areas of the EAF. Additionally, the configuration of the annular nozzle can be used for shrouding the selective fuel or particulate injection to direct them into the desired areas of the EAF. In FIG. 12 the design variable defining the angle of the surfaces forming the diverging portion of the annular nozzle is illustrated. It is seen that preferably the angle can be varied for each side of the diverging section from approximately 0 to 10 degrees on the outer sides A–A' and from 0 to –10 degrees on the inner sides B–B'. By changing this angle a directionality is imparted to the annular flow of gases through the annular orifice, more so when the gases are supersonic than when they are subsonic.

Figure 12A:
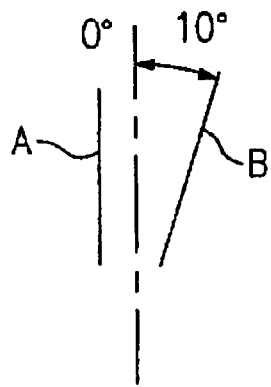
FIGS. 12a, 12b and 12c are graphical representations of the surface angles of the diverging section of the annular nozzle for a converging annular flow, a diverging annular flow and a partially converging and partially diverging annular flow.

When in one preferred annular nozzle embodiment of FIG. 12a, the angle of side B is –10 degrees and the angle of side A is 0 degrees, then the flow of gases from the nozzle will tend to flow together and inwardly toward the center line of the burner as shown in FIG. 13. When the gas is oxygen in a supersonic lancing mode, this inwardly directed flow permits better directionality for the oxygen gas flow and penetrating capability into the iron melt. The inwardly directed annular flow also keeps the oxygen stream together so that it can be directed farther than in conventional applications and supply more oxygen to a desired distant area. When this embodiment is used in conjunction with particulate injection, particularly carbon particle injection, the inwardly direction of the supersonic flow tends to break up the carbon flow near the point of convergence and can be used to spread carbon particles over a larger area than with conventional lances.

Figure 14:
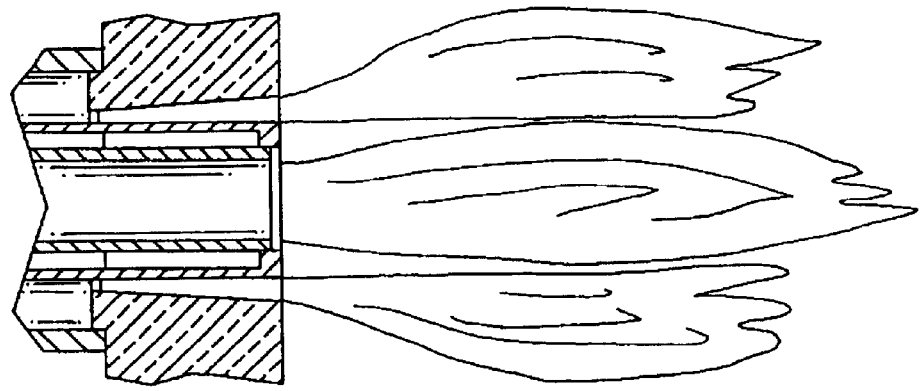
FIG. 14 is a pictorial representation of a nozzle having a diverging annular flow.
Figure 12B:
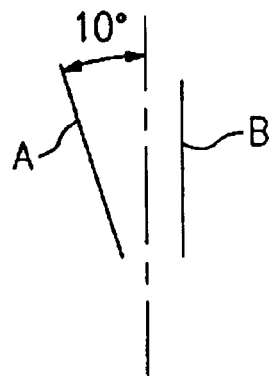

When in yet another preferred annular nozzle embodiment in FIG. 12b, the angle of side B is 0 degrees and the angle of side A is 10 degrees, then the flow of gases from the nozzle will tend to flow apart and outwardly from the center line of the burner as shown in FIG. 14. In a burner mode, the subsonic outwardly directed gas flow, preferably an oxidizing gas and in the preferred embodiment oxygen, causes the fuel and oxygen to mix and combust readily. In the oxygen lancing mode, the supersonic oxygen can be used for refining purposes with good penetrating capability and the outwardly directed nature of the oxygen flow also provides very good post combustion oxygen flow over a wide area. When used in conjunction with particulate injection, particular carbon particulate injection, the diverging flow of oxygen provides some shrouding for the carbon stream and also provides very good post combustion oxygen flow over a wide area.

Figure 12C:
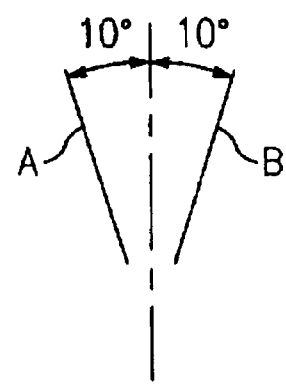

When in another preferred annular nozzle embodiment in FIG. 12c, the angle of side B is −10 degrees and the angle of side A is 10 degrees, then the flow of gases from the nozzle will tend to partially flow together and inwardly toward the center line of the burner and partially flow apart and outwardly from the center line of the burner as shown in FIG. 15. When the gas is oxygen and in a supersonic lancing mode, this partial convergence and partial divergence permits a wider area of oxygen lancing for covering the iron melt while still retaining supersonic penetrating velocity. When used in conjunction with particulate injection, particularly carbon particulate injection, the partially inwardly directed flow tends to choke or concentrate the flow of particulates without breaking them up and the partially outwardly directed flow tends to shroud the particulate flow after the converging effect. The combination of these effects is a much improved directionality and ability to inject the particulates much farther into the EAF than before. This design of the annular nozzle and mode of the burner also allows an increased carbon flow to specific desired areas of the furnace.

It is thus seen by designing the annular nozzle with different diverging sections, separate advantageous effects for the different modes of the burner can be produced. While several different embodiments of the annular nozzle have been described, it is evident that these effects can be combined to produce more of less of a particular effect needed for a specific burner in an EAF. The angles of the diverging section can be tailored to any angle for a desired location and function of a burner in a combustion system. More or less mixing of subsonic oxygen and fuel may be accomplished by this technique. Additionally, more or less convergence or divergence (shaping) of supersonic oxygen flow can be accomplished by this technique. Also, more or less directionality and shaping of the particulate flow can be accomplished by this technique.

Moreover, individual burners can be optimized for a particular function while still retaining the ability to have excellent overall multimode operation. A burner may be optimized for the most efficient burner mode and located in a specific area in the EAF where that mode is used most prevalently. A burner may be optimized for the most efficient oxygen lancing mode and located in an area of the furnace where that mode is used most prevalently. A burner may be optimized for the best particulate injection mode and located in an area of the furnace where that mode is used most prevalently. A burner may be optimized for the best post combustion oxygen mode and located in an area of the furnace where that mode is most prevalent.

While the invention has been described in connection with a preferred embodiment, this specification is not intended to limit the scope of the invention to the particular forms set forth, but, on the contrary, it is intended to cover any such alternatives, modifications, and equivalents as may be included within the spirit and scope of the invention as defined by the appended claims.

What is claimed is:

1. A method of injecting thermal energy in a furnace with a fluid cooled combustion chamber, comprising the steps of:
    injecting a fluid hydrocarbon fuel along the central axis of the combustion chamber;
    injecting through an annular nozzle a supersonic annular flow of oxidizing gas surrounding the central flow of fluid hydrocarbon fuel;
    injecting through a series of apertures surrounding the annular oxidizing gas flow, a secondary fluid hydrocarbon fuel flow; and
    injecting through a series of apertures surrounding the secondary fluid hydrocarbon fuel flow, a secondary oxidizing gas flow.

2. A method of selectively injecting additional thermal energy, high velocity oxidizing gas, particulate matter or combinations thereof in a furnace through a fluid cooled combustion chamber, comprising the steps of:
    selectively injecting fluid hydrocarbon fuel or particulates entrained in a gas along the central axis of the combustion chamber;
    selectively injecting either a subsonic or supersonic annular flow of a first oxidizing gas surrounding the flow along the central axis; and
    injecting through a series of apertures surrounding the annular first oxidizing gas flow a secondary fluid hydocarbon flow.

3. A method as set forth in claim 2 which further comprises the step of:
    injecting through a series of apertures surrounding the secondary fluid hydrocarbon fuel flow a secondary oxidizing gas flow.

4. A method as set forth in claim 2 wherein the step of selectively injecting an annular flow of oxidizing gas further comprises the step of:
    selectively injecting a converging annular flow of oxidizing gas.

5. A method as set forth in claim 4 wherein the step of selectively injecting a converging annular flow of oxidizing gas occurs at least during supersonic gas flow.

6. A method as set forth in claim 2 wherein the step of selectively injecting an annular flow of oxidizing gas further comprises the step of:
    selectively injecting a diverging annular flow of oxidizing gas.

7. A method as set forth in claim 6 wherein the step of selectively injecting a diverging annular flow of oxidizing gas occurs at least during supersonic gas flow.

8. A method as set forth in claim 2 wherein the step of selectively injecting an annular flow of oxidizing gas further comprises the step of:

selectively injecting a partially converging flow and partially diverging flow of oxidizing gas.

9. A method as set forth in claim 8 wherein the step of selectively injecting a partially converging and partially diverging annular flow of oxidizing gas occurs at least during particulate injection.

* * * * *